(12) United States Patent
Maguire (10) Patent No.: US 8,070,844 B2
(45) Date of Patent: Dec. 6, 2011

(54) DUST CLEARING BLOW-BACK VALVE AND RESERVOIR

(76) Inventor: Stephen B. Maguire, Glenn Mills, PA (US)

( * ) Notice: Subject to any disclaimer, the term of this patent is extended or adjusted under 35 U.S.C. 154(b) by 141 days.

(21) Appl. No.: 12/201,562

(22) Filed: Aug. 29, 2008

(65) Prior Publication Data

US 2009/0126564 A1 May 21, 2009

Related U.S. Application Data

(60) Provisional application No. 60/967,065, filed on Aug. 31, 2007.

(51) Int. Cl.
*B01D 46/04* (2006.01)

(52) U.S. Cl. .............. 55/283; 55/302; 95/280; 137/177; 137/628; 251/29

(58) Field of Classification Search .............. 55/283, 55/287, 302, 385.1; 95/280; 137/177, 628; 251/29
See application file for complete search history.

(56) References Cited

U.S. PATENT DOCUMENTS

| | | |
|---|---|---|
| 2,161,190 A | 6/1939 | Paull |
| 3,111,115 A | 11/1963 | Best |
| 3,115,276 A | 12/1963 | Johanningmeier |
| 3,209,898 A | 10/1965 | Beebe et al. |
| 3,348,848 A | 10/1967 | Lucking et al. |
| 3,470,994 A | 10/1969 | Schnell et al. |
| 3,570,542 A * | 3/1971 | Otto et al. .............. 137/628 |
| 3,959,636 A | 5/1976 | Johnson et al. |
| 3,985,262 A | 10/1976 | Nauta |
| 4,026,442 A | 5/1977 | Orton |
| 4,108,334 A | 8/1978 | Moller |
| 4,148,100 A | 4/1979 | Moller |
| 4,219,136 A | 8/1980 | Williams et al. |
| 4,354,622 A | 10/1982 | Wood |
| 4,402,436 A | 9/1983 | Hellgren |
| 4,454,943 A | 6/1984 | Moller |
| 4,475,672 A | 10/1984 | Whitehead |
| 4,498,783 A | 2/1985 | Rudolph |
| 4,525,071 A | 6/1985 | Horowitz et al. |

(Continued)

FOREIGN PATENT DOCUMENTS

DE 3541532 A1 5/1986

(Continued)

OTHER PUBLICATIONS

Brochure entitled "Plastic Molders and Extruders: published by Maguire Products, Inc., 1995".

(Continued)

*Primary Examiner* — Duane Smith
*Assistant Examiner* — Minh-Chau Pham
(74) *Attorney, Agent, or Firm* — Charles N. Quinn, Esq.; Fox Rothschild LLP (57) ABSTRACT

An accumulator having an internal valve opened by applying air pressure to a diaphragm with a small solenoid to apply air to the diaphragm where the air is supplied from a pilot air supply. When the internal valve operated by the diaphragm opens, it snaps to a fully open position thereby opening the valve and uncovering a passageway leading to a filter for cleaning. The passageway is sufficiently wide that the resulting flow of air through the passageway is so explosive that air pressure on the filter is distributed over the surface area of the filter for a brief moment, blowing the dust on the filter free.

3 Claims, 8 Drawing Sheets

U.S. PATENT DOCUMENTS

| | | | |
|---|---|---|---|
| 4,564,374 A * | 1/1986 | Hofmann | 95/24 |
| 4,581,704 A | 4/1986 | Mitsukawa | |
| 4,705,083 A | 11/1987 | Rossetti | |
| 4,756,348 A | 7/1988 | Moller | |
| 4,793,711 A | 12/1988 | Ohlson | |
| 4,830,508 A | 5/1989 | Higuchi et al. | |
| 4,848,534 A | 7/1989 | Sandwall | |
| 4,850,703 A | 7/1989 | Hanaoka et al. | |
| 5,110,521 A | 5/1992 | Moller | |
| 5,116,547 A | 5/1992 | Tsukahara et al. | |
| 5,132,897 A | 7/1992 | Allenberg | |
| 5,143,166 A | 9/1992 | Hough | |
| 5,148,943 A | 9/1992 | Moller | |
| 5,172,489 A | 12/1992 | Moller | |
| 5,178,652 A * | 1/1993 | Huttlin | 95/279 |
| 5,225,210 A | 7/1993 | Shimoda | |
| 5,252,008 A | 10/1993 | May, III et al. | |
| 5,261,743 A | 11/1993 | Moller | |
| 5,285,930 A | 2/1994 | Nielsen | |
| 5,340,949 A | 8/1994 | Fujimura et al. | |
| 5,341,961 A | 8/1994 | Hausam | |
| 5,423,455 A | 6/1995 | Ricciardi et al. | |
| 5,651,401 A | 7/1997 | Cados | |
| 5,767,453 A | 6/1998 | Wakou et al. | |
| 5,767,455 A | 6/1998 | Mosher | |
| 5,780,779 A | 7/1998 | Kitamura et al. | |
| 5,843,513 A | 12/1998 | Wilke et al. | |
| 5,884,654 A * | 3/1999 | Oike | 137/177 |
| 6,089,794 A | 7/2000 | Maguire | |
| 6,152,656 A | 11/2000 | Curtis et al. | |
| 6,379,086 B1 | 4/2002 | Goth | |
| 6,413,020 B1 | 7/2002 | Davison | |
| 7,066,689 B2 | 6/2006 | Maguire | |
| 7,459,003 B2 * | 12/2008 | Crockett et al. | 55/385.1 |
| 7,550,023 B2 * | 6/2009 | Schuster et al. | 55/498 |
| 2005/0120881 A1 * | 6/2005 | Sporre et al. | 95/280 |
| 2006/0086070 A1 * | 4/2006 | Althouse et al. | 55/287 |
| 2007/0039290 A1 * | 2/2007 | Lee | 55/302 |

FOREIGN PATENT DOCUMENTS

| | | |
|---|---|---|
| DE | 3923241 A1 | 1/1991 |
| DE | 4323295 C1 | 2/1995 |
| EP | 0507689 A2 | 10/1982 |
| EP | 0318170 A2 | 5/1989 |
| EP | 0587085 A2 | 3/1994 |
| EP | 0743149 A1 | 11/1996 |
| FR | 2109840 A5 | 5/1972 |
| FR | 2235775 A1 | 7/1974 |
| FR | 2517087 A1 | 5/1983 |
| GB | 2081687 A | 2/1982 |
| JP | 01-235604 | 9/1989 |
| JP | 04-201522 | 7/1992 |
| JP | 06-114834 | 4/1994 |

OTHER PUBLICATIONS

Five page brochure entitled "Blending power: GXB Blender The Better Alternative" of Mould-Tek, circa 1998.
Two page brochure entitled "Mould-Tek Bulk Handling Systems" published by Mould-Tek Industries, Inc. in Canada, circa 1993.
Advertisement entitled "Machinery and Systems for Extrusion is Our Only Business" by Process Control Corporation, circa 1993.
Advertisement entitled "Weigh Blender Delivers Unmatched Accuracy" by Universal Dynamics, Inc., circa 1993.
Advertisement entitled "A Full Line-up of Blender Solutions . . . Priced Right" by HydReclaim, circa 1993.
Advertisement entitled "New From HydReclaim—Now Processors Can Economically Achieve Continuous Gravimetric Blending" by HydReclaim, circa 1993.
Article entitled "Control Loading Systems" from Plastics Technology, Oct. 1995, p. 41.
Advertisement "Introducing our 400 VME-II Gravimetric Blender" by HydReclaim Corporation, circa 1993.
Four page brochure entitled "Gravimix Better Quality through Research", circa 1993.
Four page brochure entitled "Conomix Plus Volumetric Blender" dated Aug. 1993.
Four page brochure entitled "Conair Franklin Autocolor Y Mezclador" dated Mar. 1995.
Two-sided flyer entitled "GB 140 Series Compact Auto Weigh Blender" published by Conair Franklin in the United States, Jun. 1994.
Six page brochure entitled "Piovan Gravimetric Blenders MDW" published by Piovan Sri, Oct. 1993, Venezia, Italy.
Four page brochure entitled "When you Weigh it All Up . . . " published by Ferlin Trading, Holland, circa 1993.
Thirty-two page color catalog entitled "Maguire Color Blending Equipment" published by Maguire Products, Inc., 1993.
Sheet of 2 photographs of Mould-Tek gravimetric blender, circa 1993.
Sheet of 2 photographs of Motan gravimetric blender and feeding system with Maguire Products, Inc. controls, circa 1993.
Sheet of 3 photographs of UNA-DYN gravimetric blender, circa 1993.
Sheet of 2 photographs of Maguire Products, Inc. gravimetric blender with Conair hoppers and feeding system, circa 1993.
Sheet of 1 photograph of Hydracolor gravimetric blender, circa 1993.
Two-sided flyer entitled "Gravimix, The New Gravimetric Blending Generation" published by Ferlin, De demsvaard, Holland, circa 1993.
Two-sided color brochure entitled "Convey, Blend, Dry" published by Novatec, Inc., undated.
Three page two-sided color brochure entitled "Accuracy, flexibility and performance are at your fingertips with ConveyPacer III Series "S" Controller" of Mould-tek, 1999.
Seven page two-sided color brochure plus cover entitled "Exac-U-Batch Series Weigh Scale Blenders: Engineered to be the ultimate blend of precision and control!" of Mould-tek, 2000.
Three page two-sided color brochure entitled "We have the building blocks to integrate your entire plastics bulk handling system." of Mould-tek, 1999.
Four page two-sided color brochure entitled AEC Whitlock: Vacuum Conveying Systems: VacTrac™ Series of AEC, Inc., 1991.
One page color brochure entitled "AEC Engineering What's Next: One Touch. Two Wires. Total Control." of AEC, Inc., 2000.
One page two-sided color brochure entitled Vactrac™ Series Vacuum Conveying Controls of AEC, Inc., 2000.
One page two-sided color brochure entitled "Vacuum Conveying Systems: VacTrac™ Series 8-Station SMART™ Control" of AEC, Inc., 1997.
Two page two-sided color brochure entitled "Model GXB-2202 Exac-U-Batch Gravimetric Scale Blender: Accurate weigh scale blending under precise computer control" of Mould-tek, 2000.
Forty-four page two-sided brochure including cover and back pages entitled "Maguire: Auxiliary equipment for the plastics industry" of Maguire Products, Inc., Oct. 2000.
Two page two-sided color brochure entitled "WDMR Series Compact Dryers" of AEC Whitlock, 1998.
Two page two-sided color reprint entitled "10 most frequently asked questions about Dryers" by Joseph Dziediz, AEC/Whitlock, from Plastics Technology, Jan. 1998.
Two page two-sided color brochure entitled "Drying Systems: WD Series High Capacity Dehumidifying Dryers" of AEC Whitlock, 1997.
Three page two-sided color brochure entitled "Portable Drying and Conveying Systems: Nomad™ Series Portable Dryers", AEC Whitlock, 1998.
Two page two-sided color brochure entitled "Drying Systems: WD Series Dehumidifying Dryers" of AEC Whitlock, 1997.
Five page two-sided color brochure entitled "AEC Auxiliaries As Primary", AEC, Inc., 1999.
19 page document entitled "Model MLS — Clear Vu Eight Component Vacuum Loading System: Operation Manual" of Maguire Products, Inc. dated May 4, 1999.
One page two-sided color brochure entitled "Maguire Clear-Vu™ Loading System" of Maguire Products, Inc. 1999.
Eight page two-sided color brochure entitled "Novatec Inc. Material Conveying Solutions for the Plastics Industry", 1999.
Two page two-sided color brochure entitled Maguire Model MPM Pre-Mixers of Maguire Products, Inc., Apr. 1997.
One page, two-sided color brochure entitled "Bulk handling power: the manufacturer of the world's most advanced blender gives you the same performance in bulk handling systems" of Mould-Tek, dated Apr. 1999.

* cited by examiner

SECTION A-A

DUST CLEARING BLOW-BACK VALVE AND RESERVOIR

CROSS REFERENCE TO RELATED PATENT APPLICATION

This patent application is based on and claims the priority of U.S. provisional patent application Ser. No. 60/967,065 filed 31 Aug. 2007 in the name of Stephen B. Maguire for an invention entitled "Diaphragm Actuated Blow-Back Valve and Reservoir"; the priority is claimed under the applicable provisions of 35 USC 119 and 35 USC 120. The disclosure of U.S. provisional patent application 60/967,065 is hereby incorporated by reference in its entirety.

FIELD OF INVENTION

This invention relates to processing and conveyance of granular resin pellets and other powdery materials that must be filtered prior to use. More specifically, this invention relates to apparatus and methods of providing compressed air to a filter of a resin conveying device powered by vacuum, wherein the compressed air is applied in a direction opposite to that of the vacuum draw to clear the filter of dust and other unwanted particulate matter.

BACKGROUND OF THE INVENTION

In plastic fabrication manufacturing operations, it is not uncommon for the resin and similar particulate/powdery materials, consumed in the operation to be shipped to the manufacturing facility in heavy containers. These containers are delivered to a manufacturing facility and are stored until required for use in the manufacturing process. When the resin or other particulate matter is required for manufacture, the container is either emptied all at once, or portions of the particulate matter are removed from time to time on an as-needed basis. The containers are usually too heavy to be lifted manually. Typically a vacuum loader is used to remove the contents.

These plants typically have a supply of "pilot" air, which is at pressure just above ambient, in conduits running throughout the plants. The pilot air is controlled by solenoid or other types of valves and is used for a variety of purposes in the manufacturing plant.

These plants also typically have vacuum lines running through the plant in which relatively low level, i.e. close to but below ambient pressure, is maintained. This moderate vacuum is used for various functions in the manufacturing process.

These plants also typically high pressure air in containers or tanks located at strategic positions within the plant. This high pressure air is typically used for air blown cleaning and sometimes for blow molding, if manufacturing of finished parts is a part of the plant operation. An air compressor may be present if the plant uses significant amounts of high pressure air.

A vacuum loader includes one or more tubes coupled to a vacuum source. The tube(s) is placed within the material storage container and the loader is activated. The resin or particulate material is drawn and conveyed by suction (resulting from vacuum generated by the vacuum loader) from the container to an intermediate location, such as a dryer, prior to being fed to an injection molding machine or an extruder.

Known vacuum loaders filter the air drawn from the material storage container to reduce the presence of contaminants within the particulate resin. It is common for the vacuum source to pull air from the top of a chamber portion of the vacuum loader, to assist in manufacturing the desired product.

Vacuum is used to convey resin pellets and resin recycle material into position for processing by molding or extrusion. It is also common to place a filter in the vacuum loader, beneath the top chamber, so that all of the air drawn (typically upwardly) through the vacuum loader must pass through the filter. As a result, the air drawn through the top chamber of the vacuum loader is largely free of dust particles and other contaminants. When the vacuum drawing stops, however, the dust and contaminants remain, clogging the filter. This reduces the quantity of air that may be drawn by vacuum through the filter when the system resumes operation. It also compromises the level of suction furnished by the vacuum source.

To overcome this, it is known to blow compressed air downwardly through the filter, in a direction opposite to the direction in which the vacuum is drawn when the system operates. This "blast" of compressed air is typically provided by an air accumulator in conjunction with a solenoid operated valve. A typical accumulator includes an associated reservoir for accumulating a large volume of compressed air within a reservoir space adjacent to the filter. A solenoid actuated valve is positioned between the reservoir and the filter. When the valve is in a closed position, pressurized air accumulates within the reservoir of the air accumulator. Upon opening the solenoid valve, compressed air within the air accumulator, being exposed to the vacuum environment in the vacuum loader, evacuates the accumulator as an air blast, which is directed downwardly through the filter. The air blast applies more air to the filter at a greater pressure, for a longer time period and in a direction opposite that of the air drawn through the filter during normal operation. This reverse flow of air against the normal direction of flow of air drawn by the vacuum source cleans the filter by blasting the dust and contaminants off the filter. Without such an accumulator, the volume and pressure of air available to blow dust off the filter in the vacuum loader is limited by the amount of air that can flow through the pilot air supply line.

A solenoid operated valve and an air accumulator provide an improvement over other known vacuum loaders and filters that do not have such components. The resulting improvement however, has several limitations. For example, the resulting air blast from the accumulator acts only on a single area of the filter. This is because flow of air into the vacuum loader chamber, where the filter to be cleaned is located, is limited by the size, namely the cross-sectional area, of the internal orifice of the actuating solenoid, through which the "cleaning blast air" must pass. Even when using an accumulator having an associated reservoir, the resulting air blast is limited by the cross-sectional area of the passageway through the solenoid valve, thereby only clearing a correspondingly sized area on the filter; the remainder of the filter is not cleaned.

While simply providing a larger solenoid valve is a possible solution, there are significant cost increases associated with larger solenoid valves. Costs associated with providing a solenoid valve large enough to cover the entire filter is prohibitive. Even with this approach, there is still reduced effectiveness of the vacuum source due to the remaining clogged portions of the filter, when a solenoid valve having a passageway with a cross-sectional area less than the area of the filter is used.

A second approach to this problem is to provide multiple outlets for the air blast against the filter using multiple reservoir chambers and/or multiple solenoid valves. However, this does little to improve the situation. The available "plant" air flow in modern plastic resin processing facilities is simply too limited to provide sufficient volume and pressure for a multi-outlet configuration to function effectively.

As is apparent, there is a continued need for a highly efficient device to provide periodic air blasts in sufficient volume, at sufficient force over a sufficient area to effectively clean filter units of vacuum loaders, especially those in plants concerned with conveying granular resin pellets and regrind material to injection molding machines and extruders for fabrication.

SUMMARY OF THE INVENTION

In one of its aspects, this invention provides a high pressure accumulator chamber having a valve that is opened by applying air pressure to a diaphragm through action of a small solenoid. When the valve actuates, it snaps to a fully open position. Opening action of the valve opens a passageway that is preferably about one (1") inch in diameter, leading from an accumulator chamber to a vacuum loader filter that is to be cleaned.

The one inch diameter passageway is sufficiently wide that the resulting flow of air through the passageway is "explosive" and so is effective as a cleaner, as the "explosive" flow of air uniformly distributes itself over the essentially the entire surface area of the filter for a brief moment. As a result this invention provides a blowback device able to substantially remove all unwanted particles from the filter of a vacuum loader or other vacuum powered device.

The invention preferably includes a blowback assembly for attachment to a vacuum loader. The blowback attachment includes a housing, preferably cylindrical in shape, having a high pressure accumulator chamber, a pilot air chamber, a chamber housing the stem of the diaphragm valve and an exhaust conduit leading from the high pressure accumulator chamber to the vacuum loader selective fluid communication of the high pressure accumulator chamber with an air filter of the vacuum loader. The diaphragm of the diaphragm valve assembly isolates a pilot air chamber. The diaphragm is an elastomeric diaphragm positioned between the pilot air chamber and the exhaust conduit, and is operatively connected to a valve stem. In a preferred embodiment, the valve stem is positioned to close an intermediate passageway, that is approximately 1 inch in diameter, which connects the exhaust conduit and the high pressure accumulator chamber. Sealing engagement of the valve stem in the intermediate passageway is controlled by allowing the elastomeric diaphragm to flex in response to a pilot air introduced into the pilot air chamber In a preferred embodiment, the blowback dust removal attachment of the invention is fabricated using three co-axial cylindrical casing components with a lower cylindrical casing component housing the high pressure chamber, a middle cylindrical casing component housing the valve stem, and an upper cylindrical casing component housing the pilot air chamber. The three cylindrical casing components are retained together by a plurality of rod-like elements such that the interior wall surfaces of the cylindrical casing components form the cylindrical chamber walls. The resulting housing is preferably a rigid, inelastic material able to withstand fluid pressures in excess of 200 lbs/in$^2$.

In operation, the valve stem is actuated by movement of the diaphragm. Pilot air is supplied to the pilot air chamber by from a source of plant air at low pressure, with pilot air flow into the pilot air chamber controlled by a solenoid actuated valve. The influx of pilot air into the pilot air chamber causes flexing of the diaphragm away from the pilot air chamber, leading to movement and a rapid opening of the valve stem. This actuation of the valve stem opens the passageway connecting the exhaust conduit and the high pressure accumulator chamber so the pressurized gas (which is typically air), within the high pressure accumulator effectively immediately passes through the exhaust conduit and into a line, connected to the vacuum source, in which the filter is located. The pressurized gas is thereby directed by the conduit towards the air filter in the line leading to the vacuum source, in a direction opposite that of the normal flow of air therein, thereby largely if not entirely blowing dust and undesired particles off the filter.

As the pressurized air evacuates the accumulator chamber, the pilot air leaves the pilot air chamber since the solenoid valve, when the solenoid is not actuated, provides open communication with ambient air. This allows the diaphragm to return to its neutral state and the valve stem immediately moves in response to an associated spring to reseal the passageway between the accumulator chamber and the exhaust conduit. High pressure air then resupplies the accumulator chamber with pressurized air and the blowback dust removal attachment is ready for another next cycle.

DETAILED DESCRIPTION OF THE DRAWINGS

DETAILED DESCRIPTION OF THE INVENTION

This invention relates to processing and conveyance of granular resin pellets and other powdery materials, which materials during or after conveyance must be filtered prior to use. More specifically, this invention relates to apparatus and methods of providing compressed air to an air filter of a vacuum powered and vacuum conveying resin transport device wherein compressed air is applied to the filter, in a direction opposite that through which air is drawn by the vacuum, to clear the filter of unwanted particles. The invention provides a filter "blowback" device providing a blast of compressed air, in a reverse direction through a filter to clear the filter of dust.

Referring to FIGS. 1 through 7, a vacuum loader manufacturing aspects of the invention is illustrated with a blowback assembly designated generally 5 and a vacuum source designated generally 10. In FIGS. 1 through 4, the blowback assembly 5 of the invention is illustrated in greater detail. As illustrated in these figures, blowback assembly 5 includes a housing that may be cylindrically shaped and comprised of at least three separate cylindrical casing components designated generally 15, 25, and 30 which are coaxial, contiguous, and coupled together by internal rod elements 31.

Figure 2:
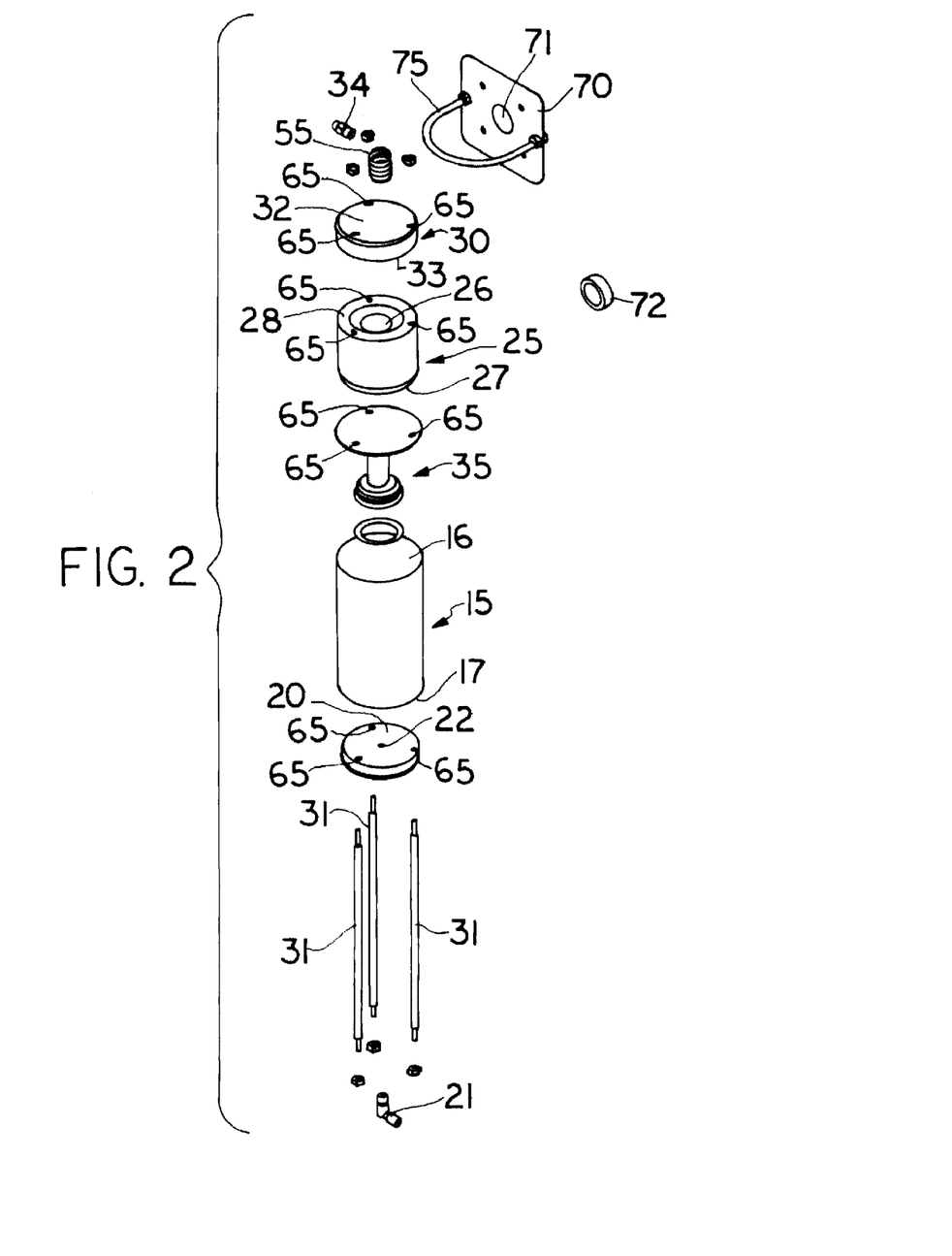
FIG. 2 is an exploded isometric view of the blowback assembly illustrated in FIG. 1.

Referring to FIG. 2, the first cylindrical casing component 15 includes a preferably cylindrical wall with an open upper end 16 and an open lower end 17 and an open passageway therebetween. This passageway forms the accumulator chamber 60 of the blowback assembly 5. To form accumulator chamber 60, a bottom disk 20 is provided sized to concentrically fit within open lower end 17 of cylindrical casing component 15. Bottom disk 20 further contains a lip 23 with a diameter approximately the same as the exterior side of the first cylindrical casing component. Lip 23 retains bottom disk 20 within lower end 17 of first cylindrical casing component 15. Spaced between lip 23 and lower end 17 of first cylindrical casing component 15 is a sealing mechanism, which may be an O-ring or a rubber gasket, or equivalent structure. The sealing mechanism provides a fluid-tight seal between lower end 17 and bottom disk 20, thereby sealing lower end 17 of first cylindrical casing component 15.

The bottom disk 20 may further include a pressurized air fitting 21. Fitting 21 is preferably received within a hole 22 that is generally centered in bottom disk 20. Fitting 21 desirably threadedly engages hole 22. Fitting 21 may be L-shaped such that one end may be received by bottom disk 20 and the remaining end may receive a pressurized air hose, which has not been illustrated in the drawings. Fitting 21 receives pressurized air flowing into the accumulator chamber 60 of first cylindrical casing component 15. Fitting 21 is removably secured to a pressurized air hose, as needed.

Figure 3:
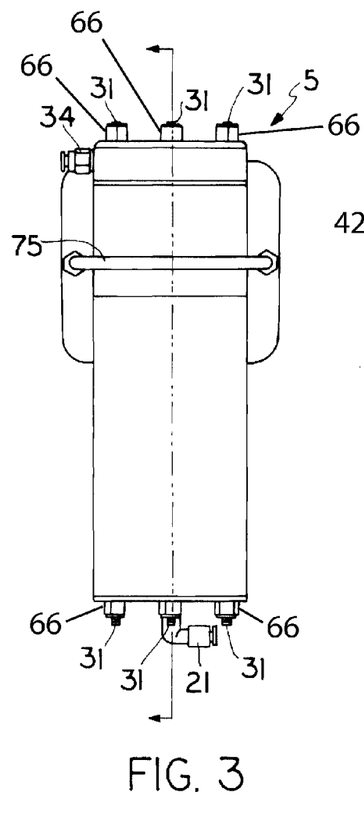
FIG. 3 is a front exterior elevation of the blowback assembly illustrated in FIGS. 1 and 2.
Figure 4:
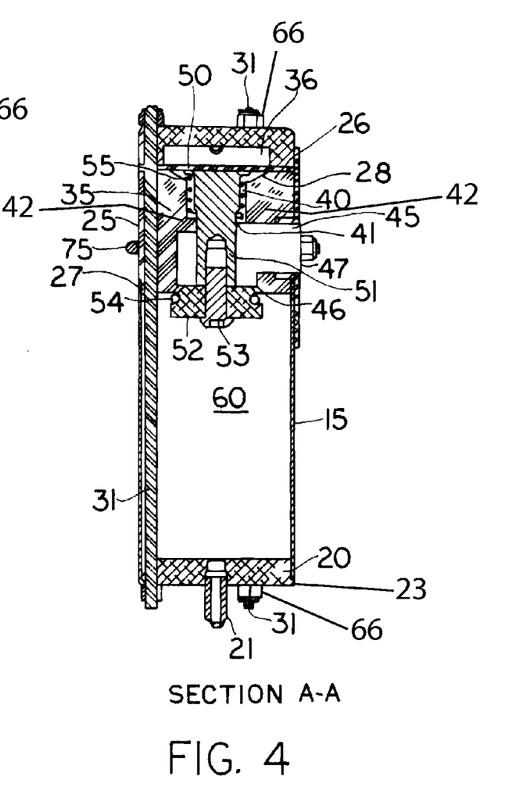
FIG. 4 is a vertical section taken at arrows A-A in FIG. 3.

Referring to FIGS. 1 through 7, coupled to open upper end 16 of first cylindrical casing component 15 and closing the upper end of the accumulator chamber 60, is a second cylindrical casing component 25. Second cylindrical casing component 25 is also preferably comprised of a cylindrical wall with an open upper end 26, an open lower end 27, and a passageway extending therethrough. While second cylindrical casing component 25 is preferably of external diameter that is the same as the external diameter of the cylindrical casing component 15, open lower end 27 of second cylindrical casing component 25 is of a slightly reduced diameter to interconnect with and be received by first cylindrical casing component 15. As shown in FIGS. 2 and 4, the open lower end 27 of the second cylindrical casing component 25 is desirably slightly stepped-down diameter such that the stepped down portion is approximately the same diameter as the interior of first cylindrical casing component 15 while the remainder of the second cylindrical casing component 25 is the same external diameter as first cylindrical casing component 15. The stepped-down diameter portion 27 of second cylindrical casing component 25 concentrically fits within and frictionally engages the interior surface of first cylindrical casing component at open upper end 16 of the first cylindrical casing component 15 such that the two cylindrical casing components connect. A sealing mechanism, such as an O-ring or a gasket, may be slidingly engaged over the stepped down portion of the second cylindrical casing component 25 such that, when the first and second cylindrical casing components 15, 25 are connected, the sealing mechanism provides a fluid seal therebetween.

While upper end 26 of the second cylindrical casing component 25 is also open, as illustrated in FIG. 2, like open lower end 27 this opening is also of reduced diameter. Upper end 26 of second cylindrical casing component 25 further includes an annular flange 28 extending perpendicularly inwardly from the cylindrical side wall of second cylindrical casing component 25, having a reduced diameter opening passing therethrough. Annular flange 28 may be integrally molded as a part of second cylindrical casing component 25 or may be a separate element or insert that is adhesively bonded or otherwise fixed to the open upper end 26 of the second cylindrical casing component 25. Preferably, annular flange 28 is beveled approaching the center opening therein so as to form a conical shape. This conical shape facilitates opening and closing of the valve stem 51 of the diaphragm valve assembly 35.

Open upper end 26 of second cylindrical casing component 25 is also adapted to receive a third cylindrical casing component 30. Like first and second cylindrical casing components 15 and 25, third cylindrical casing component 30 is similarly sized. As shown in FIGS. 1 through 4, third cylindrical casing component 30 has a closed upper end 32 and an open lower end 33, defining a cavity therein. The cavity serves as a pilot valve chamber and receives bursts of pressurized air to open and close the accumulator. Open lower end 33 of third cylindrical casing component 30 has a relatively uniform external diameter that is approximately the same as the external diameter of the second cylindrical casing component. Third cylindrical casing component 30 is secured to second cylindrical casing component by tie rods 31. A diaphragm 50 of the solenoid-actuated valve system is secured between third cylindrical casing component 30 and second cylindrical casing component 25 to form a fluid seal therebetween.

Figure 1:
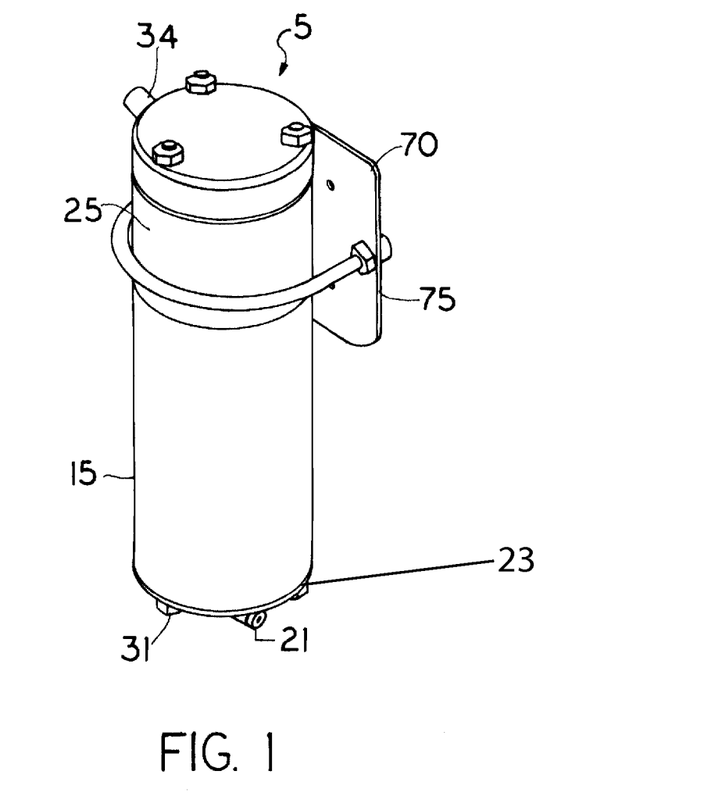
FIG. 1 is an isometric exterior view of a blowback assembly manifesting aspects of the invention.

As illustrated in FIGS. 1 and 3, the third cylindrical casing component 30 may further include an air hose fitting 34 extending therefrom. Fitting 34 is preferably received in the side wall of the third cylindrical casing component 30 by a hole or it may alternatively be received by top wall 32 of third cylindrical casing component 30. Fitting 34 preferably threadedly engages the wall of third cylindrical casing component 30. The externally facing end of fitting 34 is adapted to receive a pressurized air hose, which has not been shown in the drawings. Accordingly, fitting 34 acts as a conduit for conveying pressurized pilot air into a pilot valve chamber, which is defined by the interior cavity of the third cylindrical casing component 30. Fitting 34 may be secured to the pressurized air hose by any suitable method.

Each of the three cylindrical casing components may be any material that can withstand high pressure conditions without compromising the integrity of the cylindrical casing components 15, 25, 30. Each cylindrical casing component is constructed to withstand pressure greater than 200 pounds per square inch.

The exterior surfaces of the cylindrical casing components are preferably of uniform diameter of approximately 3 inches. Each cylindrical casing component may be of any length. The preferred final length of the assembly, e.g. the axial length of all three cylindrical casing components combined is approximately nine and three-sixteenths (9 and 3/16) inches. Most preferably, the first cylindrical casing component provides the longest part of the housing such that the accumulator chamber 60 is the largest of the chambers within the cylindrical casing components. The second cylindrical casing component provides a slightly smaller internal chamber with the third providing the smallest internal chamber.

As noted above, and illustrated in FIG. 4, the three cylindrical casing components 15, 25, 30, when assembled, form a plurality of chambers therein. As seen in FIGS. 2 and 4, such chambers are formed by the exterior walls of the first, second and third cylindrical casing components, the interior surface of the second cylindrical casing component 25 and by the diaphragm 50.

Referring to FIG. 4, interior walls extending from the annular flange 28 of the second cylindrical casing component 25 in part define a first interior chamber 40 and a second interior chamber 45. The first interior chamber 40 extends from and is in fluid communication with the reduced diameter opening of the upper open end 26 of the second cylindrical casing component 25. This chamber is preferably cylindrical with a longitudinal axis co-axial with that of second cylindrical casing component 25. First interior chamber 40 is preferably sized to receive a spring mechanism 55 such as the coil spring disclosed herein.

At the opposing end of first chamber 40 is opening 41 As shown in FIG. 4, opening 41 provides a passageway from first chamber 40 into second chamber 45; first chamber 40 and second chamber 45 are in fluid communication with each other by way of opening 41. Opening 41 is preferably of reduced diameter relative to that of first chamber 40. Most preferably, the diameter is provided by annular shoulder 42 extending perpendicularly from chamber 40 walls to form opening 41. As discussed further herein and illustrated in FIG. 4, shoulder 42 provides support for spring 55, facilitating functioning of diaphragm valve assembly 35.

Second chamber 45 is also cylindrical. However, the longitudinal axis of second chamber 45 is perpendicular to that of both first chamber 40 and second cylindrical casing component 25. As further shown in FIG. 4, at one end of second chamber 45 opening 41 leads to first chamber 40. In addition to opening 41, second chamber 45 further includes a second opening 46 and a third opening 47. Second opening 46 is preferably in direct opposition to opening 41. Second opening 46 is formed at approximately lower end 27 of second cylindrical casing component 25 such that second opening 46 provides a fluid communication pathway between second chamber 45 and lower end 27. Furthermore, as illustrated in FIG. 4, when first cylindrical casing component 15 and second cylindrical casing component 25 are interconnected, the walls forming second opening 46 serve to demarcate the second cylindrical chamber component 45 from first cylindrical casing component housing accumulator chamber 60 and form a passageway therebetween. This passageway is preferably approximately one inch (1") in diameter so as to maximize the volume of pressurized fluid reaching the targeted filter.

The interior walls at second opening 46 may be beveled to approximately a 45 degree angle. This bevel facilitates sealing engagement with a sealing element 52 of the diaphragm valve assembly 35 so as to form a valve between the chambers of second cylindrical casing component 25 and accumulator chamber 60 and the first cylindrical casing component 15. The beveled portion of second opening 46 engages an opposing beveled portion of sealing element 52 to provide a removable seal between accumulator chamber 60 of the first cylindrical casing component 15 and the chambers of the second cylindrical casing component 25.

The third opening 47 of the second interior chamber 45 is provided through a side wall of the second cylindrical casing component 25. Based on the illustrated orientation of second cylindrical chamber component 45, third opening 47 is perpendicular to opening 41, second opening 46, and the longitudinal axis of the second chamber 45. As further illustrated in FIGS. 5 and 6, third opening 47 is adapted to align with a chosen inlet or outlet of the vacuum leader or vacuum source 10. Most preferably, the third opening 47 is adapted to communicate with the chosen inlet or outlet of the vacuum loader or vacuum source 10 such that pressurized air flow exiting the second interior chamber 45 by way of the third opening 47 is directed toward and through the filter of the vacuum source 10 or vacuum loader or other vacuum device so as to eliminate unwanted particles therein.

As indicated above, extending through the second cylindrical casing component is a diaphragm valve assembly 35. More specifically, the diaphragm valve assembly 35 is comprised of a diaphragm 50, a valve stem 51, a sealing element 52, a coupling mechanism 53, an O-ring 54, and a spring 55 wherein the assembly 35 is sized to extend between the upper end 26 of the second cylindrical casing component 25 to and through the third opening 46 of the second chamber 45. Diaphragm 50 is a disk-shaped element with diameter that is equal to that of the exterior diameter of the second and third cylindrical casing components 25, 30. Diaphragm 50 is preferably sized to extend between upper end 26 of the second cylindrical casing component 25 and lower end 33 of third cylindrical casing component 30 such that when third cylindrical casing component 30 is coupled to second cylindrical casing component 25, diaphragm 50 forms a fluid seal therebetween so that diaphragm 50 acts as a sealing member between the second and third cylindrical casing components 25, 30. Diaphragm 50 further provides isolation of pilot valve chamber 36, within third cylindrical casing component 30. Diaphragm 50 is preferably an elastomeric polymer which is adapted to retain its elasticity when flexed, without rupturing under high pressure conditions. The material used to manufacture diaphragm 50 should be adapted to both flex along annular flange 28 of second cylindrical casing component and along the beveled portion contained therein and return to a normal flat condition in response to rapid pressure fluctuations and without rupturing Extending perpendicularly from diaphragm 50 is valve stem 51. Valve stem 51 is cylindrically shaped with a uniform diameter that is slightly smaller than that of opening 41. Valve stem 51 is sized to extend from diaphragm 50 through first and second chambers 40, 45 of second cylindrical casing component 25 to and through second opening 46 of second chamber 45. In one embodiment, valve stem 51 is comprised of a relatively rigid and inflexible material, desirably a metallic composition, and coupled to diaphragm 50. Valve stem 51 may be bonded or glued to diaphragm 50 or secured to diaphragm 50 using mechanical coupling means, so as to maintain the seal between second and third cylindrical casing components 25, 30 during operation.

Coupled to the end of valve stem 51 opposing diaphragm 50 by coupling mechanism 53 is sealing element 52, which is preferably a disk-shaped polymeric composition selected and sized to provide sealing engagement for second opening 46 from accumulator chamber 60. One end of sealing element 52 is preferably beveled so as to sealingly engage the opposing beveled region of second opening 46. The beveled portions of sealing element 52 and second opening 46 provide complementary regions forming an openable seal between accumulator chamber 60 and second chamber 45. Sealing element 52 may be any composition useful in sealing a valve or passageway between and/or across a pressure gradient.

Sealing element 52 is coupled to valve stem 51 by way of coupling mechanism 53. Preferably coupling mechanism 53 is a screw, bolt or the like that threadedly engages an interior passageway within valve stem 51. As shown in FIG. 4, sealing element 52 may be further secured to valve stem 51 by way of an O-ring 54, which is securable within an annular groove extending about an exterior side of the sealing element 52. The O-ring is sized to provide constrictive force on sealing element 52 such that it is secured to shaft and/or coupling mechanism 53, but without hindering the engagement of sealing element 52 with second opening 46.

Spring 55 of the valve assembly is adapted to slide over valve stem 51 so as to be secured between diaphragm 50 and sealing element 52. More specifically, the spring is preferably a coil spring with an internal diameter slightly larger than the diameter of valve stem 51.

Referring to FIG. 4, diameter of spring 55 is slightly larger than opening 41 of the first chamber and has a length closely approximating the distance between annular shoulder 42 and diaphragm 50, when installed as illustrated. Spring 55 provides actuation for the diaphragm valve assembly to move along the longitudinal axis of the blowback assembly 5. More specifically, spring 55 provides actuation to oscillate sealing element 52 into and away from a sealing engagement with second opening 46. Such oscillations are provided by the flexibility of diaphragm 50 and in response to a pilot air supply introduced into the pilot valve chamber.

As shown in FIGS. 1 and 3, the bottom disk 20, first, second and third cylindrical casing components 15, 25, 30 and diaphragm valve assembly 35 are all coupled together by one or more rods 31. Specifically, as shown in FIG. 2, each of bottom disk 20, second and third cylindrical casing components 25, 30 and diaphragm 50 contain a plurality of holes 65 spaced about the periphery of each of these parts. These holes are positioned to align along the length of the blowback assembly 5 and are sized to receive a rod 31 with a plurality of threads at each end.

As illustrated in FIG. 4, rod 31 is sized to pass from the holes 65 in bottom disk 20, through the holes in diaphragm 50, through the hole in the second cylindrical casing component 25, and, ultimately, through the holes in the third cylindrical casing component 30.

A securing mechanism 66, such as a nut, may be coupled to both ends of rod 31 as shown such that the opposing forces generated by each nut tighten the pieces of the blowback assembly 5 and, effectively, seal the interior side of the blowback assembly 5 and each of the chambers contained therewithin.

FIGS. 1 through 4 illustrate three such rods 31 as being secured therein, however, the invention is not limited to this configuration. A greater number or fewer rods may be used, so long as the seals discussed herein are effective. Finally, the invention is not limited to rod construction and assembly.

The blowback assembly 5 may be coupled to a plate so as to be easily secured to a vacuum source 10. More specifically, plate 70 is preferably metallic and uses at least one U-bolt 75 securing the blowback assembly 5 thereto. As illustrated in FIG. 2, plate 70 preferably contains a hole 71 passing therethrough which is adapted to align with third opening 47 of second cylindrical casing component 25 and a corresponding hole in the vacuum source (not illustrated) that is juxtaposed to the filter. Such alignment is further facilitated by an extension member 72. More specifically, extension member 72 aligns third opening 47, hole 71, and the hole in the vacuum source. In a further embodiment, the extension member 72 is sealingly coupled to both the third opening 47 and the vacuum source such that fluid passes therebetween without escaping from either location. Accordingly, when the blowback assembly 5 is secured to the plate 70 by way of U-bolt 75, the third opening 47 is in fluid communication with the hole passing through the plate such that air exiting the second cylindrical casing component 25 passes therethrough and into the vacuum source.

Figure 5:
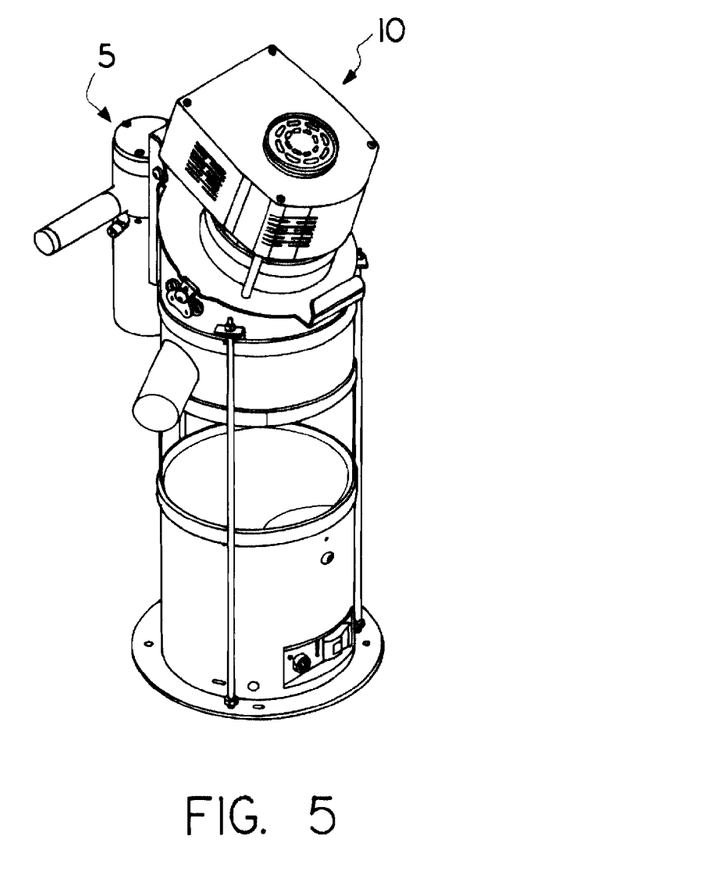
FIG. 5 is an isometric view of a conventional vacuum loader equipped with a blowback assembly as illustrated in FIGS. 1 through 4.
Figure 6:
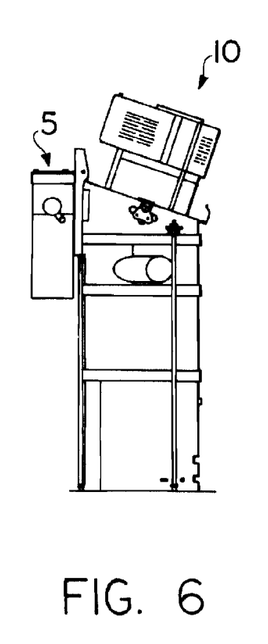
FIG. 6 is a front elevation of the vacuum loader—blowback assembly illustrated in FIG. 5.
Figure 7:
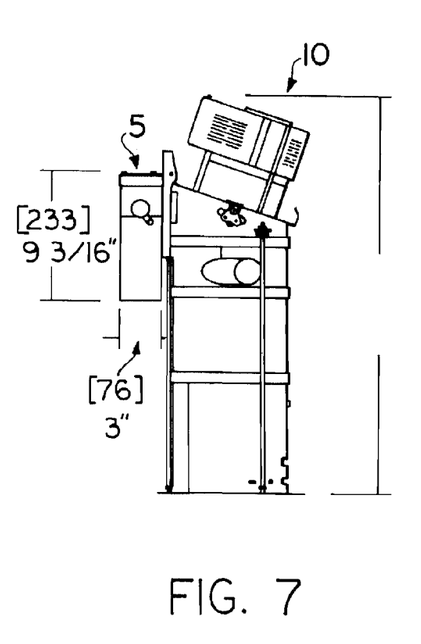
FIG. 7 is a view identical to FIG. 6, showing some dimensions of the vacuum loader—blowback assembly in the preferred embodiment of the invention.
Figure 8:
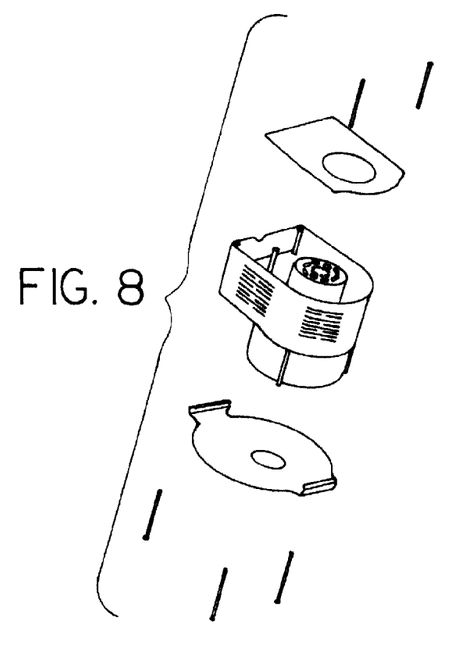
FIG. 8 is an exploded view of a motor and motor cover located at the top of the vacuum loader equipped with the blowback assembly, as illustrated in FIGS. 5, 6 and 7.
Figure 9:
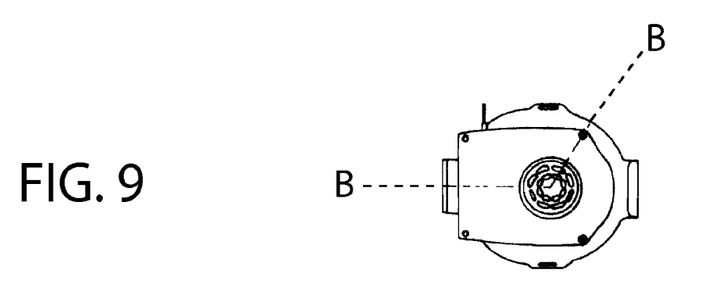
FIG. 9 is a top view of the motor cover on the vacuum loader shown in FIGS. 5 through 8 taken normally to the top exterior surface of the motor cover.
Figure 10:
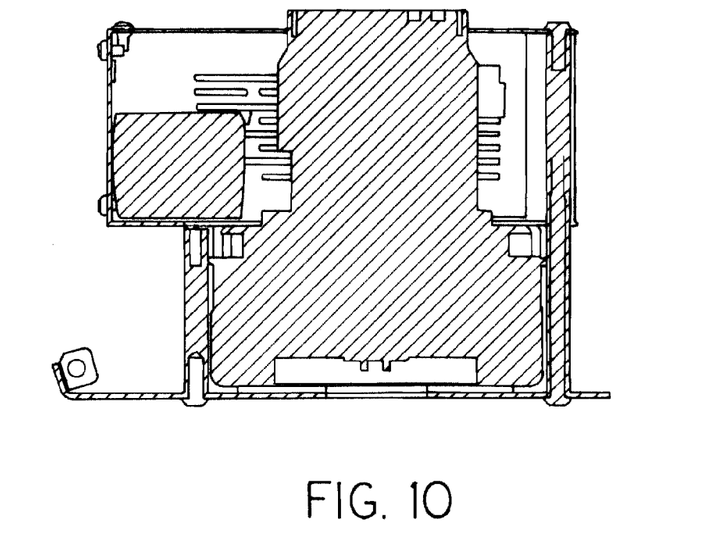
FIG. 10 is a sectional view taken at lines and arrows B-B in FIG. 9.
Figure 11:
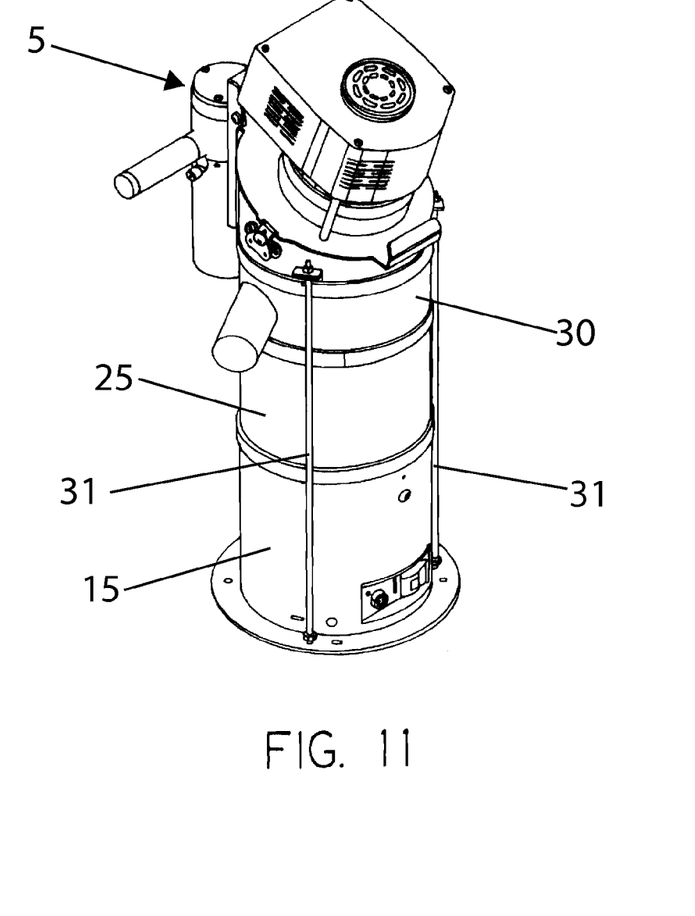
FIG. 11 is an isometric view similar to FIG. 5 with part call-out numbers included.

As illustrated in FIGS. 5 and 6, blowback assembly 5 and plate assembly are preferably secured to vacuum source 10 such that the third opening 47 of the second cylindrical casing component 25 is in fluid communication with the interior of the vacuum source 10. Preferably the blowback assembly 5 is positioned relative to the air filter of the vacuum source such that any air flow exiting the third opening passes through the filter in a direction opposite, or at least perpendicular, to the ordinary flow of air drawn by the vacuum source.

The blowback assembly 5 may be secured to the vacuum source by any suitable method. For example, the plate assembly may be secured to the vacuum source by a plurality of screws or bolts such that the blowback assembly 5 and the vacuum source are in fluid communication.

In operation, the blowback assembly 5 accumulates pressurized air, release of which is controlled by the solenoid actuated valve (which is conventional and is not illustrated) of the diaphragm valve assembly 35. Blowback assembly 5 is ordinarily in the configuration illustrated in FIG. 4 and is connected to the vacuum source as discussed above and as illustrated in FIGS. 5 through 7. In this configuration, pressurized air is pumped into the accumulator chamber 60 by hoses coupled to fitting 21 until a desired pressure is reached in accumulator chamber 60. Preferably, the pressurized air within accumulator chamber 60 is at least 200 lbs/in$^2$ (two hundred pounds per square inch) and the blowback assembly remains in this configuration while the vacuum source is used for transporting particulate resin material via suction.

When the vacuum source is no longer in use, blowback assembly 5 utilizes air pressure within accumulator chamber 60 to clean the air filter of the vacuum source. Specifically, after the vacuum source turns off, a pilot supply of air is briefly and quickly introduced via fitting 34 into the pilot valve chamber within third cylindrical casing component 30. The air is introduced in sufficient volume and at sufficient pressure to cause elastomeric diaphragm 50 to rapidly flex downwardly (considering the orientation showing in FIG. 4, for example) against the beveled surface of the annular upper wall 28 with the second cylindrical casing component 25. This, in turn, causes sealing element 52 to move downwardly, considering FIG. 4, snapping away from the second opening 46. High pressure air within accumulator chamber 60 then flows from accumulator chamber 60 into second chamber 45 of second cylindrical casing component 25 where the air is directed through third opening 47 and onto the vacuum source. Because axis of third opening 47 is perpendicular to the direction vacuum pulls air through the filter, the pressurized air forced out of third opening 47 blows through the air filter essentially uniformly over the air filter surface in a direction opposition of normal air flow of air as drawn by the vacuum. Opening 47 is approximately 1 inch in diameter, facilitating the elimination of dust and particles trapped on the filter.

As the burst of air is released from the accumulator chamber into the vacuum source, thereby cleaning the filter, pressure within the pilot valve chamber is almost immediately relieved. This reduces pressure on the diaphragm and on spring element 55 Accordingly, force exerted on diaphragm 50 by spring element 55 causes diaphragm 50 to return to its neutral configuration. Such movement by diaphragm 50 away from the upper annular wall 28 of second cylindrical casing component also causes sealing element 52 to reengage with the beveled walls of second opening. Accordingly, the blowback assembly quickly returns to its neutral configuration. Accumulator chamber 60 is then resupplied with pressurized air through fitting 21, so the blowback assembly is ready for the next cycle.

The invention is advantageous through use of the accumulator and the solenoid valve. Having an accumulator allows the loader to accumulate a larger volume of air immediately adjacent to the filter. The solenoid valve is relatively small and requires only a pilot air supply to actuate the valve to an open position. When the solenoid valve opens, it snaps open, immediately leaving an approximately 1 inch length and diameter passage uncovered. The resulting flow of air is so intense and explosive, air pressure on the filter is effectively uniformly distributed over the entire surface area of the filter for a very brief moment, and essentially all of the dust is blown free from the filter.

I claim:

1. A blowback dust removal attachment for a vacuum loader, comprising:
   a) a housing comprising three coaxial contiguous cylindrical sections having uniform diameter, the interior of a first one of the sections defining a high pressure chamber, the interior of a third one of the sections defining a pilot air chamber, an intermediate chamber within a second one of the sections and a one inch diameter exhaust port from the intermediate chamber of the housing opening outwardly to the exterior through the second cylindrical section in a direction perpendicular to the axis of the cylindrical sections which is adapted for connection to vacuum loader proximate a dust filter located therewithin;
   b) a single diaphragm valve within the second cylindrical section of the housing opening responsively to increase in pressure in the pilot air chamber and providing a openable seal between the high pressure chamber and the intermediate chamber, comprising;
      i) a diaphragm positioned between the pilot air chamber and the intermediate chamber, forming a boundary of the pilot air chamber;
      ii) a valve stem positioned over a passageway between the conduit and the high pressure chamber and operatively coupled to the diaphragm to facilitating opening and closing of the passageway in response to deflection of the diaphragm;
   c) a fitting for connecting an air supply to the pilot air chamber to move the diaphragm in response to pressurized air furnished to the pilot air chamber; and
   d) the high pressure chamber of the housing being adapted for connection to a source of high pressure air
   e) a first disk member retained by and fitting snugly within an end portion of the first cylindrical section to define one end of the housing;
   f) a second disk member retained by and fitting snugly within an end portion of the third cylindrical section to define a remaining end of the cylindrical housing;
   g) a plurality of rods extending between and through the disk members, central portions of the rods passing through the diaphragm and being within the cylindrical housing, ends of the rods being threaded;
   h) fasteners in threaded engagement with the rods on both ends of the rods outboard of the disks, to retain the rods in place and the cylindrical sections in tight contacting engagement.

2. The blowback dust removal attachment of claim 1 wherein the housing is comprised of a rigid, inelastic material able to withstand pressurized fluid in excess of 200 lbs/in$^2$.

3. A method for removing dust from a filter of a vacuum loader comprising;
   a) providing an attachment to a vacuum loader wherein the attachment is comprised of
      i) a housing comprising three coaxial contiguous cylindrical sections having uniform diameter, the interior of a first one of the sections defining a high pressure chamber, the interior of a third one of the sections defining a pilot air chamber, an intermediate chamber within a second one of the sections and a one inch diameter exhaust port from the intermediate chamber of the housing opening outwardly to the exterior through the second cylindrical section in a direction perpendicular to the axis of the cylindrical sections which is adapted for connection to vacuum loader proximate a dust filter located therewithin;
      ii) a single diaphragm valve within the second cylindrical section of the housing opening responsively to increase in pressure in the pilot air chamber and providing a openable seal between the high pressure chamber and the intermediate chamber, comprising;
      iii) a diaphragm positioned between the pilot air chamber and the intermediate chamber, forming a boundary of the pilot air chamber;
      iv) a valve stem positioned over a passageway between the conduit and the high pressure chamber and operatively coupled to the diaphragm to facilitating opening and closing of the passageway in response to deflection of the diaphragm;
      v) a fitting for connecting an air supply to the pilot air chamber to move the diaphragm in response to pressurized air furnished to the pilot air chamber; and
      vi) the high pressure chamber of the housing being adapted for connection to a source of high pressure air;
      vii) a first disk member retained by and fitting snugly within an end portion of the first cylindrical section to define one end of the housing;
      viii) a second disk member retained by and fitting snugly within an end portion of the third cylindrical section to define a remaining end of the cylindrical housing;
      ix) a plurality of rods extending between and through the disk members, central portions of the rods passing through the diaphragm and being within the cylindrical housing, ends of the rods being threaded;
      x) fasteners in threaded engagement with the rods on both ends of the rods outboard of the disks, to retain the rods in place and the cylindrical sections in tight contacting engagement,
   actuating the diaphragm to provide open fluid communication between the high pressure chamber and the exhaust port
   c) to allow flow of pressurized gas from the high pressure chamber to the exhaust port.

* * * * *